United States Patent [19]
Beni et al.

[11] 4,201,454
[45] May 6, 1980

[54] HEAT TREATED ELECTROCHROMIC DEVICES

[75] Inventors: Gerardo Beni, Westfield; Joseph L. Shay, Holmdel, both of N.J.

[73] Assignee: Bell Telephone Laboratories, Incorporated, Murray Hill, N.J.

[21] Appl. No.: 919,418

[22] Filed: Jun. 27, 1978

[51] Int. Cl.$^2$ .............................................. G02F 1/17
[52] U.S. Cl. .................................................. 350/357
[58] Field of Search ........................................ 350/357

[56] References Cited
PUBLICATIONS

Rand et al., "Electrochemical and Physiochemical Studies of Oxygen Layers on Iridium and Ruthium Electrodes", *Proceedings of the Symposium on Electrode Materials and Processes for Energy Conversion and Storage*, vol. 77-6 (1977), pp. 217-233.

Gottesfeld et al., "Electrochemical and Optical Studies of Thick Oxide Layers on Iridium and their Electrocatalytic Activities for the Oxygen Evolution Reaction", *J. Electroanal. Chem.* vol. 86, No. 1 (1978) pp. 89-104.

Rand et al., "Cyclic Voltommetric Studies on Iridium Electrodes in Sulfuric Acid Solutions-Nature of Oxygen Layer and Metal Dissolution", *J. Electroanal. Chem.* vol. 55, (1974) pp. 375-381.

Bold et al., "Studies on the Anodic Formation and Cathodic Reduction of the Oxygen Coverage on Rhodium and Iridium", *Electrochimica Acta*, 5, (1961), pp. 169-179.

*Primary Examiner*—James W. Davie
*Attorney, Agent, or Firm*—Bruce S. Schneider

[57] ABSTRACT

Electrochromic devices based on anodic iridium oxide as the electrochromic material have been made. These devices exhibit long term stability, memory, and good response times, e.g., less than 80 msec. for reflectivity changes of about 70% (50 msec. for 50% changes). Devices using an anodic iridium oxide film immersed in a sulfate electrolyte have been operated for more than $6 \times 10^5$ coloration/bleaching cycles at 0.5 Hz without noticeable change in properties. Response times and stability are also improved by a heat treatment of the anodic iridium oxide at temperatures between 40 and 100 degrees C.

6 Claims, 8 Drawing Figures

FULL CYCLE

BLEACHING RESPONSE

COLORATION RESPONSE

HEAT TREATED ELECTROCHROMIC DEVICES

BACKGROUND OF THE INVENTION

1. Field of the Invention

This invention relates to electrochromic devices.

2. Art Background

Electrochromics have potentially significant advantages over other display devices, and therefore, are presently being contemplated for use in large area displays. For example, the electrochemical reactions relied on in electrochromic devices usually require only small amounts of d.c. power. The reduced power involved in operating electrochromic devices limits the difficulties involved in contemplated circuitry design for large scale arrays. Additionally, since electrochromics rely on electrically induced chemical changes, such devices usually have a memory. That is, once a chemical change is initiated by an appropriate electrical signal, the induced chemical state, with a different coloration than the initial state, is typically very stable. Within a reasonable time period, the color does not change until a suitable electrical impulse is supplied which reverses the chemical reaction. This memory property is essential for many applications such as indicator displays.

The stability provided by an electrically induced chemical reaction, at least a priori, also offers the possibility of long term reliability. However, secondary effects often defeat this inherent long term stability. For example, tungsten bronzes are one type device which utilize a solid electrochromic in contact with an electrolyte. An electrode containing material such as $H_xWO_3$ or $Li_xWO_3$ ($0<x<1$) is contacted with an electrolyte such as sulfuric acid. These cells initially exhibit the desirable properties, such as memory, inherent in electrochromics although the response times are too long for many applications. However, a significant degradation of properties due to corrosion—a common disadvantageous secondary effect—is prevalent in such devices. Although the cells have usable response times for some applications, continued use produces a total failure of the tungsten bronze electrode. (See for example, Randin, J. P. *Journal Electronic Materials*, 7, 47 (1978).)

It is generally postulated that this unacceptable phenomenon results from the dissolution of the tungsten bronze in the electrolytes used. Attempts to substitute a less corrosive medium while maintaining response times have not been successful. (See, for example S. K. Mohapatra, J. Electrochem. Soc. 125, 284 (1978).) Thus, the inherent attributes of electrochromic devices are alluring. However, problems such as corrosion and excessive response times are significant in these devices.

SUMMARY OF THE INVENTION

Electrochromic devices having advantageous stability properties have been made utilizing a heat treated anodic iridium oxide electrode. The anodic iridium oxide electrode is heat treated, preferably while in the colored mode, to temperatures in the range 40 to 100 degrees C. Both measurably shortened response times for a given reflectivity change and measurably increased stability for such devices has been observed. Higher temperatures than 100 degrees C, although potentially useful, cause boiling of most electrolytes and thus associated inconveniences.

DETAILED DESCRIPTION

Figure 1:
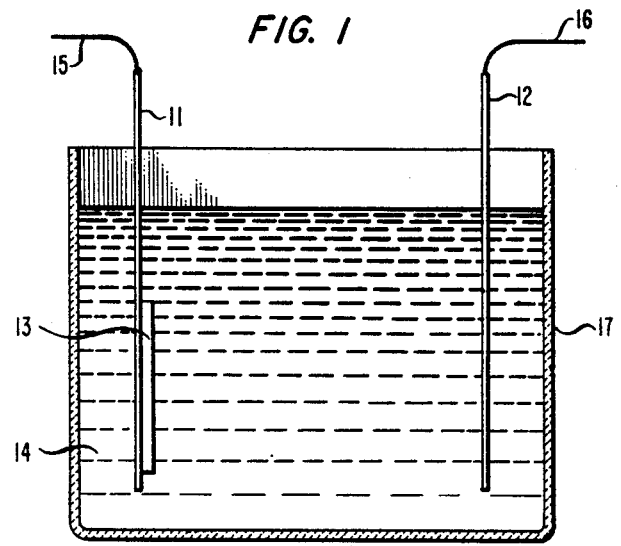
FIG. 1 is a schematic representation of electrochromic devices within the concept of the invention.

In a preferred embodiment, the anodic iridium oxide electrodes (13 in FIG. 1), utilized in the inventive devices, are produced by anodic oxidation of Ir metal in an electrochemical cell using 0.5 M $H_2SO_4$ as the electrolyte. Such oxidation is well known in the art and has been described in detail. (See, for example D. A. J. Rand and R. Woods, *Journal of Electroanalytical Chemistry and Interfacial Electrochemistry*, 55, 375 (1974). The use of voltage pulses in this method to produce growth has reduced the time necessary for this operation and yielded reproducible films with suitable response times. Briefly, a sheet or film of Ir is immersed typically in a 0.5 M aqueous solution of $H_2SO_4$. An inert counter electrode and a saturated calomel electrode (SCE) are also immersed in the $H_2SO_4$ solution. One second wide voltage pulses alternating between 1.2 V and −0.3 V are maintained between the Ir electrode and a SCE reference electrode to grow the anodic iridium oxide film. (The SCE is utilized to unambiguously fix the electrical parameters related to growth.) The use of triangular shaped waveforms with extrema at the above voltage values is also usable to grow the films but requires a longer growth time.

The thickness of the anodic iridium oxide film is an important factor in determining the reflectivity change and response times for a given applied voltage. Response times and the change in reflectivity generally increase with increased film thickness. Thus, changing the thickness improves one parameter at the expense of the other. Thicknesses in the range 500 Å to 5000 Å generally simultaneously produce acceptable response times and reflectivity changes. Thinner films are typically not preferred because inadequate reflectivity changes occur while thicker films are generally less desirable due to increased response times.

Thicknesses refer only to the dimension of the anodic iridium oxide layer and do not include any Ir metal backing. The thickness of the anodic iridium oxide layer is controlled by the time the growth process is continued. As noted, it is possible to partially oxidize either thin films or sheets of Ir. To monitor the extent of growth, a cyclic voltammogram is periodically performed, the peak current of which is closely proportional to film thickness. (See E. Gileadi et al., *Interfacial Electrochemistry, An Experimental Approach*, Addison-Wesley (1975) page 370 for a description of voltammograms.) Further, it has been observed that the same number of pulses applied during the growth process reproducibly leads to the same thickness. For example, 135 pulse cycles (4.5 min.) yields a growth thickness of approximately 2000 Å. The device does not depend at all on an Ir backing for the anodic iridium oxide electrochromic material. Devices built by evaporating a thin film, e.g., 100 to 1000 Å of Ir onto an inert electrode and then totally oxidizing this Ir layer by the method described are also possible.

Contact to the anodic iridium oxide electrode to supply a source of electrons is made by conventional methods. For example, when the Ir is not completely oxidized, a tin coated copper, platinum or iridium wire, 15, is simply attached by a pressure contact or spot welding to an unoxidized portion, 11, of the Ir sheet. (Relative proportions in FIG. 1 have been exaggerated to facilitate illustration.) If the Ir is oxidized to completion, a film of iridium is first deposited on a substrate by conventional techniques such as electron beam evaporation and a portion of the initially deposited Ir is masked before oxidation. This masked portion is then used to contact the ultimate device. Alternatively, a layer of a conducting material such as $SnO_2$ is deposited on an inert substrate, e.g., glass, and then followed by deposition of a layer of Ir onto a portion of the previously deposited $SnO_2$. (Again, these depositions are done by conventional techniques such as electron beam evaporation for Ir and sputtering for $SnO_2$.) After oxidation of the Ir, contact is made to the uncoated portion of the underlying conductive material.

The anodic iridium oxide electrode, after it is prepared, is contacted with an electrolyte, 14, having a pH adjusted to be in the range 2 to 12, preferably in the range 3.5 to 10.5. (Typically, $H_2SO_4$ or NaOH is used to adjust the solution to the desired pH.) For example, useful electrolytes include sulfate or nitrate containing solutions such as aqueous $Na_2SO_4$, and aqueous $LiNO_3$ solutions. A pH above 12 or below 2 is unacceptable for most applications because of corrosion. Use of electrolytes containing sulfate ions produce the best long term stability.

The electrolyte used must have a sufficiently high ionic conductivity so that response times are not unduly limited. Typically, conductivities above 0.01 $ohm^{-1}$ $cm^{-1}$ are necessary to maintain response times faster than 1 sec. Preferably, conductivities above 0.1 $ohm^{-1}$ $cm^{-1}$ should be used to achieve response times faster than 100 msec. Lower conductivities, down to 0.003 $ohm^{-1}$ $cm^{-1}$ are operative provided thin spacing between the electrodes is employed. Electrolytes having an ionic concentration greater than 0.5 molar generally have conductivities sufficiently high to permit response times faster than 100 msec. to be achieved.

A counter electrode, 12, is also contacted with the electrolyte. The material used as a counter electrode is not critical. However, evolution of gases, for example $H_2$ or $O_2$ from electrolysis of water, is to be substantially avoided. For a given material, used as a counter electrode, the voltage and, thus, the current must be limited to prevent such evolution. Appropriate voltage ranges for a given cell are determined by recording a cyclic voltammogram. A substantial increase in the current at a particular voltage on the voltammogram indicates the voltage limits for operation. These voltage limits depend on the cell construction and, particularly, the pH and composition of the electrolyte. For example, voltages of +0.8 V versus SCE for coloration and −0.7 V versus SCE for bleaching are preferred for a 0.5 M $Na_2SO_4$ solution at pH 3.5. However, at pH 10.5 (for the same solution) voltages of +0.7 V versus SCE and −0.8 V versus SCE, respectively, are used.

It is desirable for the counter electrode, 12, to be inert to the electrolyte used and to have a high electronic conductivity. For example, electrodes made of platinum are suitable. Contact to the counter electrode, 16, is made by conventional techniques such as soldering or through pressure contacts.

For initial characterization of the subject devices, both a SCE and a counter electrode are contacted with the electrolyte in addition to the anodic iridium oxide. The coloration and bleaching potentials (as determined from the voltammogram) are maintained by using a potentiostat. (See E. Gileadi et al. supra at page 181.) The use of the SCE insures that the potential difference between the anodic iridium elctrode and the solution is held constant at the proper levels. Therefore, the cell parameters are easily characterized. When the device is made without the SCE, a current is applied directly between the counter electrode and the anodic iridium oxide electrode. In this situation, there is a possibility of voltage variation during the bleaching or coloration cycle. The variation should be limited to values at which negligible decomposition or electrolysis of the electrolyte occurs. Additionally, it is preferably that the anodic iridium oxide does not grow further during operation of the cell as an electrochromic device. Additional growth causes variation of response time and reflectivity change. Growth is detected by an increase in the amount of charge required to effect coloration or bleaching. If growth is observed, it is desirable to further limit the voltage to eliminate this observed growth. These factors put a further limitation on the voltage in addition to that imposed by the other cell parameters such as the pH of the electrolyte. Nevertheless, to achieve the fastest possible response times, it is desirable to use the extreme allowable values for voltage within this range. For a given cell, a controlled sample is used to determine the usuable voltage range. Despite these limitations on the voltage amplitude, coloration and bleaching times as low as 60 to 80 msec. (70% reflectivity change at 5460 Å and 45 degrees angle of incidence) are achievable.

Figure 6:
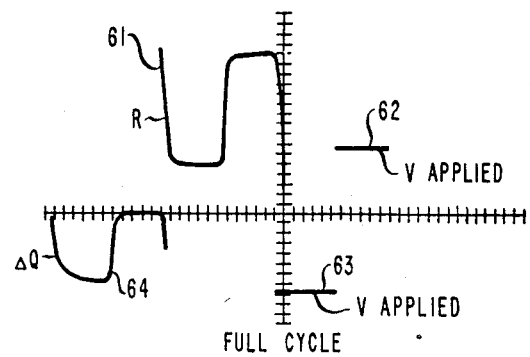
FIGS. 6 through 8 illustrate the optical and electrical properties of electrochromic devices containing anodic iridium oxide electrodes.
Figure 7:
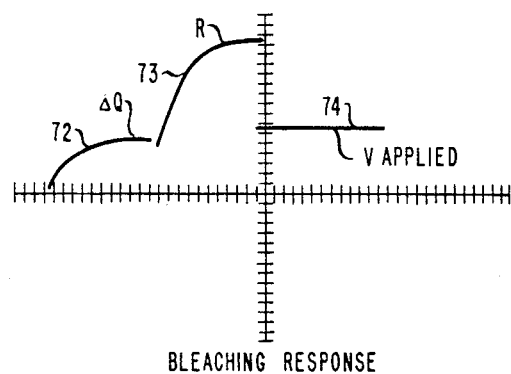
Figure 8:
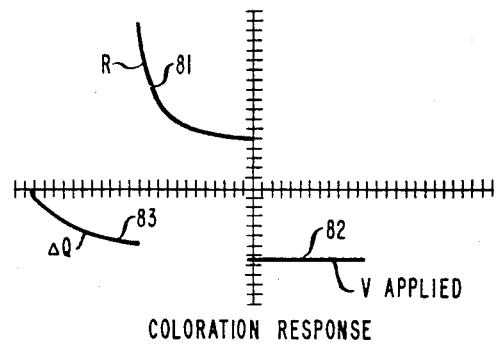

It is particularly advantageous to utilize, in the subject devices, an aqueous sulfate containing solution having a pH adjusted by a suitable acid or base, e.g., $H_2SO_4$ or NaOH, in the range 2 to 12, preferably 3.5 to 10.5. (It should be noted that at pH 1.9 the sulfate ion and the bisulfate ion are present at equal concentrations. Therefore, the use of the word sulfate as to this pH region also encompasses the presence of bisulfate ions.) The acid or base in the concentrations used is chose, so that it does not substantially react with, cause changes in the porous structure of, or dissolve the anodic iridium oxide. Using this solution, extremely good stability has been obtained for the devices. For example, devices within this embodiment have been cycled at a rate of 0.5 Hz using a bleaching potential and coloration potential of −0.7 V and +0.8 V (measured versus SCE), respectively, for a period of 330 hours. After this extended operation, cycle times and reflectivity changes have not measurably varied from those initially observed. The transient response of these devices is graphically displayed in FIGS. 6, 7, and 8. The three curves in FIG. 6 were simultaneously recorded on a time scale (the abscissa) of 0.16 sec./div., during a complete coloration /bleaching cycle imposed by two constant potential pulse—coloration was achieved at +0.8 V versus SCE and bleaching at −0.7 V versus SCE. The potential pulses are shown as the rightmost graph in FIGS. 6 through 8. Line 63 shows the constant coloration potential and line 62, the constant bleaching potential (sensitivity −0.1 V per division; positive axis points downward). The resulting reflective variation is shown in the middle graph (line 61). It can be seen that during coloration, the reflectance drops by about 70% as compared with its level in the bleached state. Curve 64 indicates the charge injected during each half cycle (at 2.6 mC cm$^{-2}$/div., positive exits downwards). The closed form of this curve shows that 100% efficiency for the coloration/bleaching cycle (no significant side reactions) is achieved. The FIGS. 7 and 8 show, on a finer time scale (16 ms/div.), for coloration and bleaching, respectively, the same information as in FIG. 6. Curves 73 and 81 describe the variation of the reflectance immediately following the voltage pulses and indicate that a response time of about 60 msec. is achieved with the anodic iridium oxide film for both coloration and bleaching. Curves 72 and 83 indicate the accumulation of charge during the short interval immediately following the bleach and coloration pulse, respectively. Lines 74 and 82 display the constant applied potentials during bleaching and coloration, respectively. (The sensitivities on the ordinates in all the three figures are identical.)

The use, generally, of solutions adjusted to the appropriate pH range containing anions other than sulfate is also useful. For example, solutions of sodium nitrate, potassium nitrate, sodium perchlorate and sodium phosphate, are usable. These electrolytes produce satisfactory contrast and response times for a more limited period than sulfate containing electrolytes.. However, in each case, greater stability is achievable than is possible when an electrolyte of the corresponding acid, e.g., perchloric acid, for perchlorate solutions is employed. Cations such as Cl$^-$ and citrates react adversely with anodic iridium oxide and should naturally be avoided. It should be emphasized that the sulfate anion, irrespective of the associated cations used, is the cause of the increased stability. Therefore, electrolytes with a pH in the appropriate range and with the appropriate conductivity which have sulfate entities are particularly useful for the practice of the subject preferred embodiment.

Figure 2:
FIGS. 2 through 5 illustrate the effect of heat treatment on devices containing anodic iridium oxide electrodes.
Figure 3:
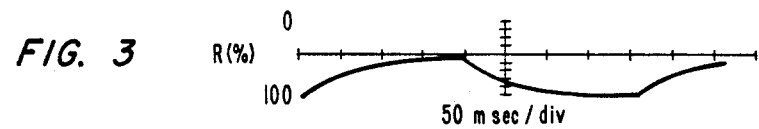
Figure 4:
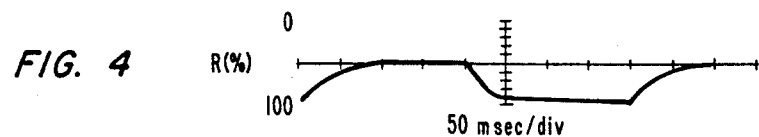
Figure 5:
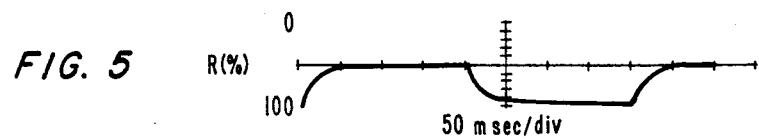

Heat treatment of the anodic iridium oxide electrode also has an advantageous stability effect. This heat treatment is preferably applied by heating the electrolyte while the electrode is immersed in a SO$_4^=$ ion containing electrolyte to temperatures in the range 40 to 100 degrees C. Higher temperatures are inconvenient because boiling occurs for most common electrolytes and lower temperatures produce no noticeable change from the untreated embodiment. The necessary treatment time is 1 to 5 min. at the desired temperature. Longer times begin to cause film dissolution. After heat treatment, the devices with a previously untreated anodic iridium oxide electrode exhibit increased stability and shortened response time. For example, an anodic iridium oxide electrode having a diameter of 0.3 cm in 0.5 M H$_2$SO$_4$ exhibits response times of 30 to 40 msec. for a reflectivity change of 50% at normal incident for light of wavelength 6328 Å as compared to the response time of about 150 msec. for the untreated counterpart under the same conditions. The results obtained for a device having a 1.0 cm in diameter anodic iridium oxide electrode is indicated graphically in FIGS. 2, 3, and 4. Similarly, in FIG. 5 the results for a device with a 0.3 cm diameter anodic iridium oxide electrode is displayed. Each device utilized a 0.5 M sulfuric acid electrolyte, an anodic iridium oxide thickness of aout 2500 Å, a +1 V coloration and 0.0 V bleaching voltage applied between the anodic iridium oxide and a SCE, using a platinum counter electrode. The graph of FIG. 2 shows the initial characteristics before treatment; FIG. 3 shows the characteristics of a sample, heat treated in the bleached state, and FIG. 4 shows the results after heat treatment in the colored area. The characteristics after $6 \times 10^5$ cycles at 50 msec. per cycle of a cell heat treated in the colored state is shown in FIG. 5. This last result indicates a substantial increase in stability over that previously obtainable with 0.5 M H$_2$SO$_4$. Additionally, increased stability is obtainable with electrolytes having a pH in the range 2 to 12. For example, a device having a heat treated anodic iridium oxide electrode and a 10 M aqueous LiNO$_2$ electrolyte shows no significant degradation in response time when run at coloration potential of 1.0 V and bleaching potential of 0.0 versus SCE (2.5 Hz) for a period of about 20 hours.

Although this phenomenon with respect to increased response time might, in part, be due to thinning of the anodic iridium oxide layer, another phenomenon appears also to be present. For example, heat treating an anodized iridium electrode with diameter 1 cm when it is in a colored state produces a cycle time of 80 msec. for a reflectivity change of 50% at normal incidence for 6328 Å light. In contrast, heat treating the anodic iridium oxide—even an electrode previously heat treated when in the colored state—when it is in a bleached state produces a cycle time of 400 msec. for similar experimental conditions. As discussed, the heat treament is thus preferably performed on a colored electrode.

We claim:

1. An electrochromic device comprising a first electrode and a second electrode contacted with an electrolyte CHARACTERIZED IN THAT said first electrode contains anodic iridium oxide, which has been heat treated at a temperature in the range from 40 to 100 degrees C.

2. The electrochromic device of claim 1 wherein said heat treatment is done while said iridium oxide is in a colored state.

3. The electrochromic device of claim 1 wherein the pH of said electrolyte is in the range of 2 to 12.

4. The electrochromic device of claim 3 wherein the conductivity of said electrolyte is greater than 0.01 ohm$^{-1}$ and cm$^{-1}$.

5. The electrochromic device of claim 4 wherein said electrolyte is an aqueous lithium nitrate solution.

6. The electrochromic device of claim 4 wherein said electrolyte contains sulfate ions.

* * * * *

UNITED STATES PATENT AND TRADEMARK OFFICE
CERTIFICATE OF CORRECTION

PATENT NO. : 4,201,454
DATED : May 6, 1980
INVENTOR(S) : Gerardo Beni and Joseph L. Shay It is certified that error appears in the above-identified patent and that said Letters Patent are hereby corrected as shown below:

Column 4, line 31, "usuable" should be --usable--.
Column 4, line 60, "pulse" should be --pulses--. Column 5, line 3, "exits" should be --axis--. Column 6, line 6, "aout" should be --about--. Column 6, line 13, "area" should be --state--. Column 6, line 21, "$LiNO_2$" should be --$LiNO_3$--.

Signed and Sealed this

Ninth Day of September 1980

[SEAL]

Attest:

SIDNEY A. DIAMOND

*Attesting Officer*    *Commissioner of Patents and Trademarks*